March 9, 1948. R. S. ROBINSON 2,437,272
PROCESS FOR THE PRODUCTION OF ALKALI METAL METHYLATES
Filed March 9, 1944
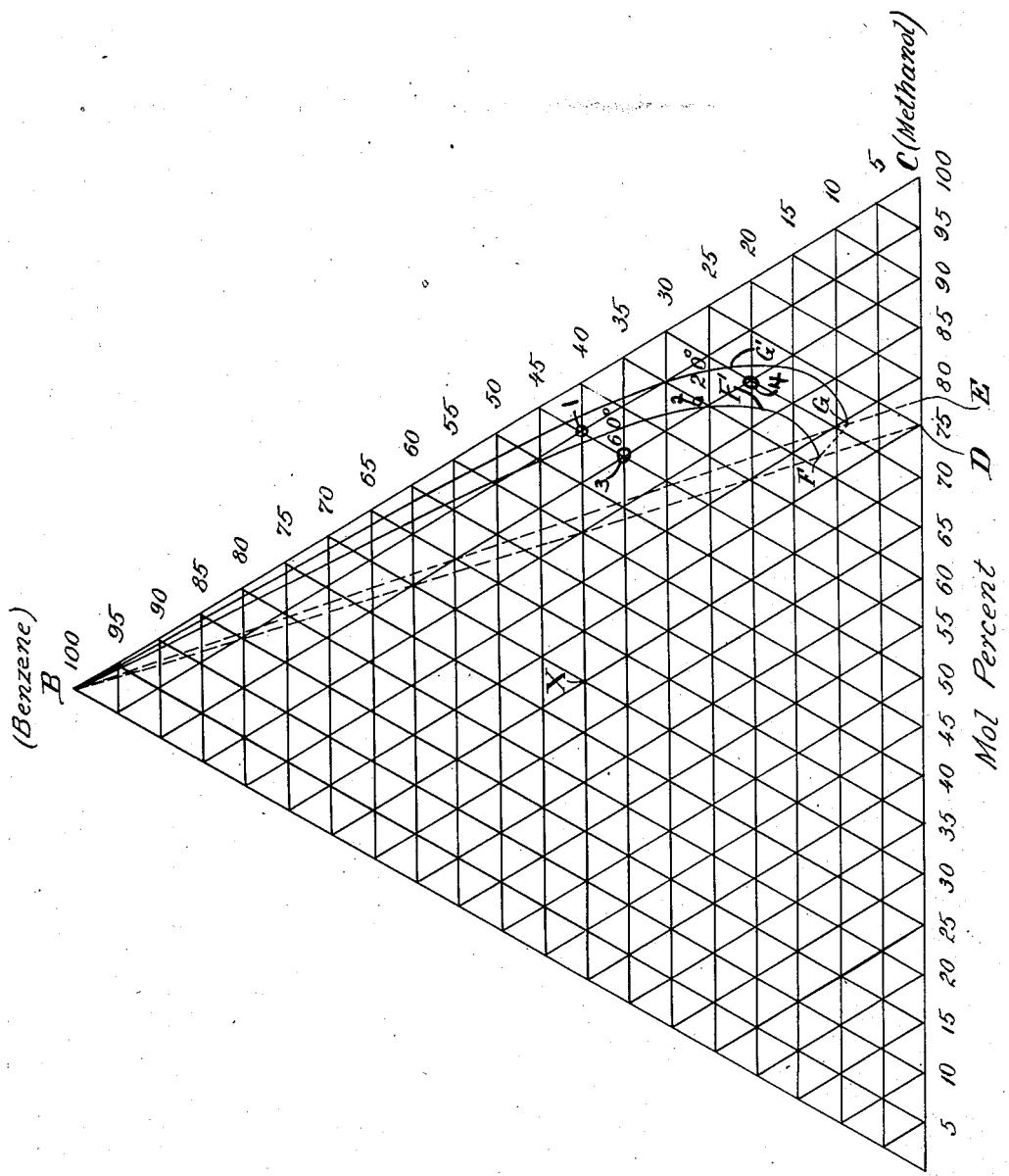
INVENTOR
Richard S. Robinson
BY Robert B Clark
ATTORNEY Patented Mar. 9, 1948

2,437,272

UNITED STATES PATENT OFFICE 2,437,272

PROCESS FOR THE PRODUCTION OF ALKALI METAL METHYLATES

Richard Sewall Robinson, Gloucester, Mass., assignor to Allied Chemical & Dye Corporation, a corporation of New York Application March 9, 1944, Serial No. 525,687

8 Claims. (Cl. 260—632)

This invention relates to the manufacture of alkali metal methylates, and to the manufacture of anhydrous or highly concentrated alkali metal hydroxides.

Alkali metal methylates find extensive use in the manufacture of synthetic organic chemicals. At the present time the methylates are prepared by three general methods. The first method involves a direct synthesis of the methylates from the alkali metal and methanol; because of the necessity of using the relatively expensive alkali metal, and because of the hazards involved in handling the alkali metal and in carrying out the reaction, this method has not been particularly satisfactory. A second method involves the reaction of an alkali metal hydroxide and methanol in the presence of an immiscible liquid such as kerosene, the water evolved by reaction of the hydroxide and methanol being removed in the form of an azeotropic mixture with the immiscible liquid; however, this reaction is difficult to carry to completion and the distillation problems involved add considerably to the expense of the product. The third method for the preparation of the methylates involves the reaction of methanol and an alkali metal amalgam in the presence of a grid or contact electrode; while this procedure possesses certain advantages over the methods above mentioned, it has been found that the reaction rate between the amalgam and methanol is extremely sensitive to the concentration of methylate product in the reaction medium, with the result that either very dilute solutions of the methylate must be recovered as product, from which methanol must be evaporated, or reactors of disproportionate size must be employed. Because of the factors above mentioned, none of the above methods for the manufacture of methylates is completely satisfactory from a commercial standpoint.

It is an object of this invention to provide an improved process for the manufacture of alkali metal methylates.

It is another object of this invention to provide an improved process for the preparation of anhydrous or highly concentrated alkali metal hydroxides.

I have discovered that alkali metal methylates may be advantageously prepared by reacting an alkali metal amalgam with methanol in the presence of an aryl azo compound, the amount of methanol being in excess of that theoretically required for the reaction and the proportions of reactants being such that none of the methylate product precipitates, and separating the reaction mixture into two liquid layers, one layer comprising a solution of the methylate in the excess methanol and the other a solution, substantially free of alkali, of the aryl hydrazo compound corresponding to the aryl azo compound employed in a solvent therefor. Separation of the two liquid layers may be effected by having present during the reaction an amount of aromatic hydrocarbon solvent for the aryl azo compound sufficient to cause two layers to form; or if the reaction is carried out in the absence of such hydrocarbon solvent or in the presence of an amount of such solvent inadequate to cause the formation of two layers, the desired separation of layers may be effected by adding sufficient aromatic hydrocarbon solvent to the reaction mixture. My invention may also be performed by carrying out the reaction in the presence of an amount of hydrocarbon solvent insufficient to cause formation of the desired two layers, and then, after removal of the spent amalgam, effecting formation of the layers by adding additional quantities of the methylate produced to the mixture. In accordance with the preferred embodiment of my invention, formation of the methylate is accomplished in the presence of an amount of an aromatic hydrocarbon solvent insufficient to cause formation of the desired two layers at the temperature of the reaction but sufficient to cause two layers to form at a somewhat lower temperature, the spent amalgam then separated from the homogeneous liquid containing the desired reaction products and the reaction mixture cooled to cause the desired two layers to form.

By operating in accordance with my invention the methylate may be quickly and easily prepared in concentrated form and separated from other products of the reaction. i. e., the aryl hydrazo compound and spent amalgam, in a simple and efficient manner. There is also produced in accordance with my invention a solution of the aryl hydrazo compound substantially free of alkali which may be used as such or processed as desired; thus for example, the hydrazo compound may be converted back to the azo compound in any suitable manner and the azo compound then utilized for the manufacture of additional quantities of alcoholate. My invention is also applicable to the production of anhydrous or highly concentrated alkali metal hydroxides by incorporating in the methanol an amount of water at least equivalent to that required to cause the methylate produced by the reaction of amalgam and alcohol to be converted into the corresponding hydroxide; thus my invention affords a method for producing highly pure alkali metal hydroxides in a simple and efficient manner.

The expression "aryl azo compound" is employed throughout the specification and claims to denote a compound containing the —N=N— grouping having an aryl radical attached to each of the nitrogen atoms and the expression "aryl hydrazo compound" is employed to denote compounds containing the —NH—NH— grouping having an aryl radical attached to each of the nitrogen atoms.

The process of my invention will be described in connection with the production of sodium methylate, the compound prepared in accordance with the preferred embodiment of the invention, although it will be understood other alkali metal methylates may be prepared in manners similar to that described for the production of sodium methylate.

The accompanying drawing, Fig. 1, shows a ternary diagram of the sodium methylate-benzene-methanol system produced in accordance with my invention and, as fully explained hereinafter, indicates the ranges of the proportions of these constituents which may be used in the practice of my invention. In considering this diagram, it should be recalled that in carrying out my invention an aryl azo compound, e. g., azobenzene, is employed in an amount at least equal to that required to react with the hydrogen liberated by the reaction between the methanol and sodium amalgam so that the corresponding hydrazo compound is always present in the reaction product in amounts proportional to the methylate present; thus, if azobenzene is employed, as is preferred, hydrazobenzene will be present in the reaction product in amounts such that the mol ratio of hydrazobenzene to methylate is 1:2; if two layers are formed, the hydrazobenzene is found in the aromatic hydrocarbon layer. The ternary diagram referred to was prepared for mixtures produced by the reaction of methanol and sodium amalgam in the presence of benzene and an amount of azobenzene equal to that required to react with the hydrogen generated, so that hydrazobenzene in the amounts above indicated is always present in the mixtures. However, it is to be understood amounts of azobenzene or other aryl azo compounds in excess of the amount needed to react with the hydrogen generated may be used; in such cases a ternary diagram for the system would have the same general appearance but would differ in small details from the one set forth in Fig. 1.

In this diagram points A, B and C of the triangle denote systems containing 100% sodium methylate (along with the co-produced hydrazobenzene), benzene and methanol respectively; the line AB represents mixtures of sodium methylate and benzene containing no methanol; the line AC, mixtures of sodium methylate and methanol containing no benzene; and the line BC, mixtures of benzene and methanol containing no sodium methylate. Points in the interior of the triangle represent all possible mixtures of the three ingredients, which mixtures, as above pointed out, will also contain hydrazobenzene in amounts such that the mol ratio of hydrazobenzene to methylate is 1:2. The mol percentages of methylate, benzene and methanol present in a mixture represented by a point in the interior of the triangle may be determined by the length of the lines drawn from the point in question perpendicular to BC, AC and AB respectively; for example, point X of the diagram represents a mixture containing 40 mol per cent benzene (which may also be determined by following the horizontal line intersecting point X to the scale on line BC), 30 mol per cent methanol (which may also be determined by following the diagonal line passing through point X and running upwardly from left to right of the triangle to the scale on line AC), and 30 mol per cent sodium methylate (which may also be determined by following the diagonal line intercepting point X and running upwardly from right to left of the triangle to the scale on line AC and subtracting the figure read, i. e., 70, from 100).

On this diagram the area enclosed by the lines AB, BD and AD includes mixtures in which solid sodium methylate exists at 60° C.; at 20° C. such mixtures are included within the area defined by lines AB, BE and AE. The area bounded by dotted line BF and the solid curve BF"F includes systems which at 60° C. would consist of 2 liquid layers, one comprising benzene (as well as hydrazobenzene) and the other a solution of sodium methylate in methanol; the area enclosed by dotted line BG and solid curve BG'G includes mixtures which at a temperature of 20° C. would consist of the two layers above described. The area bounded by BC, CD, DF and FF"B includes mixtures which at 60° C. would be a homogeneous mixture of methanol, benzene and sodium methylate (plus hydrazobenzene); the area bounded by BC, CE, EG and GG'B includes mixtures of the three ingredients which would be homogeneous at a temperature of 20° C.

In accordance with the preferred embodiment of my invention production of sodium methylate may be carried out by dissolving azobenzene in a solvent medium comprising methanol and benzene, adding sodium amalgam thereto and agitating the mixture at a temperature between about 20° and about 60° C., the amount of methanol being in excess of that required for the reaction and the proportions of reactants and solvents being such that the resulting reaction mixture has a composition falling within the area on the triangular diagram bounded by solid curves BG'G and BF'F and line FG; i. e., the area between the 20° and 60° curves, so that at the temperature of the reaction a homogeneous reaction mixture is formed. Since reaction of methanol with the alkali metal of the amalgam theoretically calls for one mol of alkali metal per mol of methanol, it is a simple matter to adjust the reative amounts of methanol and sodium amalgam so that a reaction product having a sodium methylate-methanol-benzene ratio falling within the aforementioned area is produced; the amount of azobenzene employed is preferably approximately equivalent to that required to react with the hydrogen liberated by the reaction. For example, a mixture of the composition represented by point 4 on the diagram may be derived from the interaction at 60° C. of 10 mols of sodium (as sodium amalgam), 80 mols of methanol and 5 mols of azobenzene in the presence of 20 mols of benzene. Such a mixture would, in terms of the diagram, contain 70 mol per cent methanol, 20 mol per cent benzene and 10 mol per cent sodium methylate; it would also contain 5 mols of hydrazobenzene. At the termination of the reaction, the homogeneous mixture may be cooled to 20° C. whereby the desired formation of two liquid layers occurs, one layer comprising chiefly a solution of sodium methylate in methanol and the other a solution of hydrazobenzene in benzene; the sodium methylate product may be recovered by washing the solution thereof with benzene to remove residual hydrazobenzene and then evaporating the methanol. This embodiment of my invention is illustrated in Example 1 below.

The process of my invention may also be carried out by reacting sodium amalgam with methanol and azobenzene at a temperature between 20° and 60° C. and in the presence of a solvent medium comprising methanol, or a mixture of methanol and benzene, the reactants and solvents being in such proportions that the composition resulting from the reaction, preferably containing at least 5 mol per cent sodium methylate, is homogeneous and falls within the area BCEGG'B at 20° C. or the area BCDFF''B at 60° C. (between the extremes of 20° and 60° C. the reaction mixture should fall within an area which increases with increasing temperature from the 20° area to the 60° area); at the termination of the reaction benzene is then added to the homogeneous liquid to form a mixture falling within the area BGG'B at 20° C. or BFF''B at 60° C. (or in the appropriate intermediate areas at temperatures between 20° and 60° C.), whereby two layers separate, one comprising chiefly a solution of sodium methylate in methanol and the other a solution of hydrazobenzene in benzene. Sodium methylate may be recovered as above described. Example 2, hereinbelow, illustrates this embodiment of the invention.

The process of my invention may also be carried out employing proportions of reactants and solvents such that the desired two layers will be formed at the conclusion of the reaction, i. e., so that the reaction mixture will have a composition falling within the area BFF''B at 60° C. or the area BGG'B at 20° C.; between the extremes of 20° and 60° C. the reaction mixture should fall within an area which increases with decreasing temperature from the 60° area to the 20° area. The two liquid layers formed may be separated from the unreacted amalgam and sodium methylate recovered from the solution thereof as described. Such a process is illustrated in Example 3 hereinbelow.

My invention may also be carried out by employing proportions of reactants and solvents such that a reaction mixture containing at least 9 mol per cent benzene and falling within the area BCEGG'B at 20° C. or one containing at least 13 mol per cent benzene and falling within the area BCDFF''B at 60° C. is produced (at temperatures between 20° and 60° C. the minimum mol per cent benzene and the area will increase with increasing temperature); at the termination of the reaction sodium methylate may be added to the homogeneous mixture to bring the composition within the area BGG'B at 20° C. or BFF''B at 60° C. (or appropriate intermediate areas at temperatures between 20° and 60° C.), so as to form two liquid layers. Such a process is illustrated in Example 4 below.

From a consideration of the ternary diagram, it will be evident it is highly important in the practice of my invention to limit the degree of conversion of methanol to sodium methylate so as to avoid precipitation of the methylate product. At 60° C., for example, not more than 25 mol per cent of the methanol should be converted to sodium methylate and at 20° C. not more than about 22% should be converted. The degree of conversion may be suitably controlled by adjusting the proportions of sodium amalgam and methanol so that excessive production of the methylate is avoided. Production of solid methylate is highly disadvantageous in that it becomes admixed with the amalgam from which it is difficultly separable, thereby resulting in reduced yields of product.

It will be understood that while the above description deals with the production of sodium methylate, potassium methylate and lithium methylate may also be prepared in a similar manner. It is further to be understood that hydrocarbon solvents other than benzene, e. g., toluene or xylene, may be employed. In place of azobenzene, azotoluene or substituted azo compounds, such as the amino azo compounds, may be used. The temperature at which the reaction may be carried out may vary considerably but preferably is between about 20° and 60° C.; at temperature substantially above 60° C. elevated pressures may be required. The amalgam employed may desirably contain from 0.02% to 0.3% by weight alkali metal.

If it is desired to prepare anhydrous or highly concentrated alkali metal hydroxides in accordance with this invention, an amount of water at least equivalent to the amount required to react with the methylate formed by the reaction of the alkali metal and methanol is incorporated in the reaction mixture so that at the termination of the reaction a solution of the desired hydroxide product in methanol is recovered; the particular amount of water added will vary, depending upon whether an anhydrous or highly concentrated product is desired. It is evident that mixtures of methylates and hydroxides may be produced by suitably controlling the amount of water.

The following examples are illustrative of my invention; amounts are given in parts by weight:

Example 1

182 parts of azobenzene were dissolved in 1250 parts of benzene and 767 parts of absolute methanol. 23,000 parts of 0.2% sodium amalgam were then added and the mixture agitated at 60° C. for 5 minutes. The homogeneous liquid having a composition corresponding to point 1 on Fig. 1 was then separated from the spent amalgam and cooled to 20° C. whereby two layers formed. Sodium methylate was recovered from the methanol layer by washing the layer with benzene and evaporating the methanol.

Example 2

182 parts of azobenzene were dissolved in 452 parts of benzene and 528 parts of absolute methanol. 23,000 parts of 0.2% sodium amalgam were then added to the solution and the mixture agitated at 60° C. for five minutes. At the end of this time the spent amalgam was separated from the homogeneous liquid having a composition corresponding to point 2 on Fig. 1 and to this liquid 156 parts of benzene were added whereby two layers formed. The methanol layer containing dissolved therein the sodium methylate was washed with benzene to remove traces of hydrazobenzene and the methanol was then evaporated to recover solid sodium methylate.

Example 3

182 parts of azobenzene were dissolved in 545 parts of benzene and 416 parts of methanol. 23,000 parts of 0.2% sodium amalgam were then added to the solution and the mixture agitated at 60° C. for 5 minutes. At the end of this time two liquid layers formed which were withdrawn from the spent amalgam and separated from one another; the reaction mixture had a composition corresponding to point 3 on Fig. 1. The methanol layer was then washed with benzene and evaporated to recover solid sodium methylate.

Example 4

182 parts of azobenzene were dissolved in 1250 parts of benzene and 767 parts of absolute methanol. 23,000 parts of 0.2% sodium amalgam were then added and the mixture agitated at 60° C. for 5 minutes. The homogeneous liquid having a composition corresponding to point 1 on Fig. 1 was then separated from the spent amalgam and 43.2 parts of sodium methylate were added to the liquid whereby two layers formed. Sodium methylate was recovered from the methanol layer by washing the layer with benzene and evaporating the methanol.

Since certain changes may be made in carrying out the above process without departing from the scope of the invention, it is intended that all matter contained in the above description shall be interpreted as illustrative and not in a limiting sense.

I claim:

1. A process for the manufacture of alkali metal methylates which comprises reacting an alkali metal amalgam with methanol in the presence of an aryl azo compound, the amount of methanol being in excess of that theoretically required for the reaction, forming a solution of the methylate thus produced in the excess methanol, forming a solution of the aryl hydrazo compound corresponding to the aryl azo compound employed in a solvent therefor immiscible with methanol, and maintaining these solutions at a temperature such that they separate into two liquid layers.

2. A process for the manufacture of alkali metal methylates which comprises reacting an alkali metal amalgam with methanol at a temperature between about 20° and about 60° C. in the presence of an aryl azo compound and an aromatic hydrocarbon solvent, the amount of methanol being in excess of that theoretically required for the reaction and the proportions of reactants and solvents being such that the reaction mixture formed is homogeneous at 60° C. but is in the form of two liquid layers at 20° C., one layer comprising a solution of the methylate in the excess methanol and the other a solution of the aryl hydrazo compound corresponding to the aryl azo compound used in the aromatic hydrocarbon solvent, cooling the homogeneous reaction mixture formed to 20° C. and separating the layers thus formed.

3. A process for the manufacture of alkali metal methylates which comprises reacting an alkali metal amalgam with methanol in the presence of an aryl azo compound, the amount of methanol being in excess of that theoretically required for the reaction, and the proportions of reactants and solvents being such that a homogeneous reaction mixture is produced containing at least 5 mol percent sodium methylate, adding an amount of an aromatic hydrocarbon solvent to the reaction mixture sufficient to cause the formation of two layers, one comprising a solution of the methylate in the excess methanol and the other a solution of the aryl hydrazo compound corresponding to the aryl azo compound used in the hydrocarbon solvent, and separating said layers.

4. A process for the manufacture of alkali metal methylates which comprises reacting an alkali metal amalgam with methanol in the presence of an aryl azo compound and in a solvent medium comprising an aromatic hydrocarbon solvent, the amount of methanol being in excess of that theoretically required for the reaction, and the proportions of reactants and solvents being such that the reaction mixture formed comprises two liquid layers, one a solution of the methylate in the excess methanol and the other a solution of the aryl hydrazo compound corresponding to the aryl azo compound used in the hydrocarbon solvent, and separating the two layers.

5. A process for the manufacture of sodium methylate which comprises reacting sodium amalgam with methanol at a temperature between about 20° and about 60° C. in the presence of azobenzene and in a solvent medium comprising benzene, the amount of methanol being in excess of that theoretically required for the reaction, and the proportions of reactants and solvents being such that the reaction mixture formed falls within the area BF'FGG'B on the accompanying diagram, cooling the mixture, and separating a solution of the methylate in the excess methanol from a solution of hydrazobenzene in benzene.

6. A process for the manufacture of sodium methylate which comprises reacting sodium amalgam with methanol at a temperature between about 20° and about 60° C. in the presence of azobenzene and in a solvent medium comprising benzene, the amount of methanol being in excess of that theoretically required for the reaction and the proportions of reactants and solvents being such that the reaction mixture formed contains at least 5 mol percent sodium methylate and falls within the area BCEGG'B on the accompanying diagram at 20° C. and within the area BCDFF'B at 60° C., between the extremes of 20° and 60° C. the reaction mixture falling within an area which increases from the 20° area to the 60° area with increasing temperature, adding sufficient benzene to the reaction mixture to cause two layers to form, and separating a solution of the methylate in excess methanol from a solution of hydrazobenzene in benzene.

7. A process for the manufacture of sodium methylate which comprises reacting sodium amalgam with methanol at a temperature between about 20° and 60° C. in the presence of azobenzene and in a solvent medium comprising benzene, the amount of methanol being in excess of that theoretically required for the reaction and the proportion of reactants being such that the reaction mixture falls within the area BFF'B on the accompanying diagram at 60° C. and BGG'B at 20° C., between the extremes of 20° and 60° C. the reaction mixture falling within an area which progressively increases from the 60° area to the 20° area with decreasing temperature, and separating two layers, one layer comprising a solution of the methylate in the excess methanol and the other a solution of hydrazobenzene in benzene.

8. A process for the production of anhydrous or highly concentrated alkali metal hydroxides which comprises reacting an alkali metal amalgam with methanol in the presence of an aryl azo compound and in the presence of an amount of water at least equivalent to the amount required to react with the methylate formed by the reaction of the amalgam with the methanol, the amount of methanol being in excess of that theoretically required for the reaction, and separating the reaction mixture into two liquid layers, one comprising a solution of the hydroxide in methanol and the other a solution of the aryl hydrazo compound corresponding to the aryl azo compound employed in a solvent therefor.

RICHARD SEWALL ROBINSON.

REFERENCES CITED

The following references are of record in the file of this patent:

UNITED STATES PATENTS

| Number | Name | Date |
|---|---|---|
| 1,712,830 | Kyrides | May 14, 1929 |
| 2,000,329 | Heisel et al. | May 7, 1935 |
| 2,069,403 | Cunningham | Feb. 2, 1937 |
| 2,083,691 | Cunningham | June 15, 1937 |
| 2,069,404 | Cunningham | Feb. 2, 1937 |

FOREIGN PATENTS

| Number | Country | Date |
|---|---|---|
| 817,014 | France | Aug. 24, 1937 |